(12) United States Patent
Watanabe

(10) Patent No.: US 10,726,523 B2
(45) Date of Patent: Jul. 28, 2020

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Jun Watanabe, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 183 days.

(21) Appl. No.: 15/908,901

(22) Filed: Mar. 1, 2018

(65) Prior Publication Data

US 2018/0260934 A1 Sep. 13, 2018

(30) Foreign Application Priority Data

Mar. 10, 2017 (JP) ................................ 2017-046509

(51) Int. Cl.
*G06T 3/40* (2006.01)
*H04N 9/73* (2006.01)
*H04N 5/232* (2006.01)
*H04N 9/04* (2006.01)

(52) U.S. Cl.
CPC .......... *G06T 3/4038* (2013.01); *G06T 3/4015* (2013.01); *H04N 5/23229* (2013.01); *H04N 9/045* (2013.01); *H04N 9/735* (2013.01)

(58) Field of Classification Search
CPC . G06T 3/4038; G06T 3/4015; H04N 5/23229; H04N 9/045
See application file for complete search history.

(56) References Cited

U.S. PATENT DOCUMENTS

| 7,551,204 | B2* | 6/2009 | Muraki | H04N 9/045 348/222.1 |
| 9,030,574 | B2* | 5/2015 | Takayama | H04N 9/735 348/223.1 |
| 9,160,999 | B2* | 10/2015 | Hayashi | H04N 9/045 |
| 10,027,938 | B2* | 7/2018 | Fujiwara | H04N 1/60 |
| 10,366,475 | B2* | 7/2019 | Naruse | G06T 5/003 |
| 2014/0232901 | A1* | 8/2014 | Furuta | H04N 9/045 348/223.1 |
| 2018/0260934 | A1* | 9/2018 | Watanabe | G06T 3/4038 |

FOREIGN PATENT DOCUMENTS

JP 2014-110623 A 6/2014

* cited by examiner

*Primary Examiner* — Gregory M Desire
(74) *Attorney, Agent, or Firm* — Cowan, Liebowitz & Latman, P.C.

(57) ABSTRACT

An image processing apparatus comprises: a white balance correction unit configured to perform a white balance correction by amplifying at least one color signal in relation to mosaic image data; a compression unit configured to compress the mosaic image data; and a control unit configured to control at least the white balance correction unit and the compression unit, wherein the control unit in a case where compression by the compression unit is set to be off, controls the white balance correction to be substantially invalid, and outputs the mosaic image data, and in a case where compression by the compression unit is set to be on, controls the white balance correction to be valid, and outputs the mosaic image data after the white balance correction.

15 Claims, 10 Drawing Sheets

FIG. 1

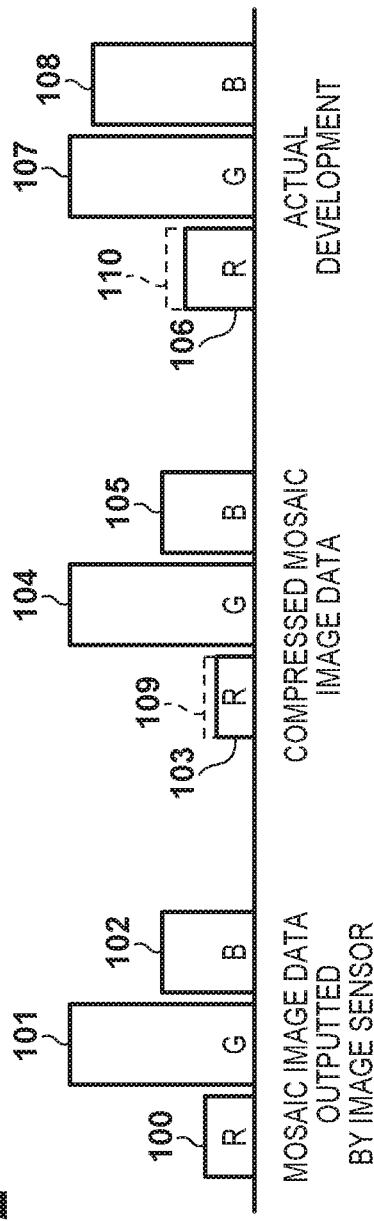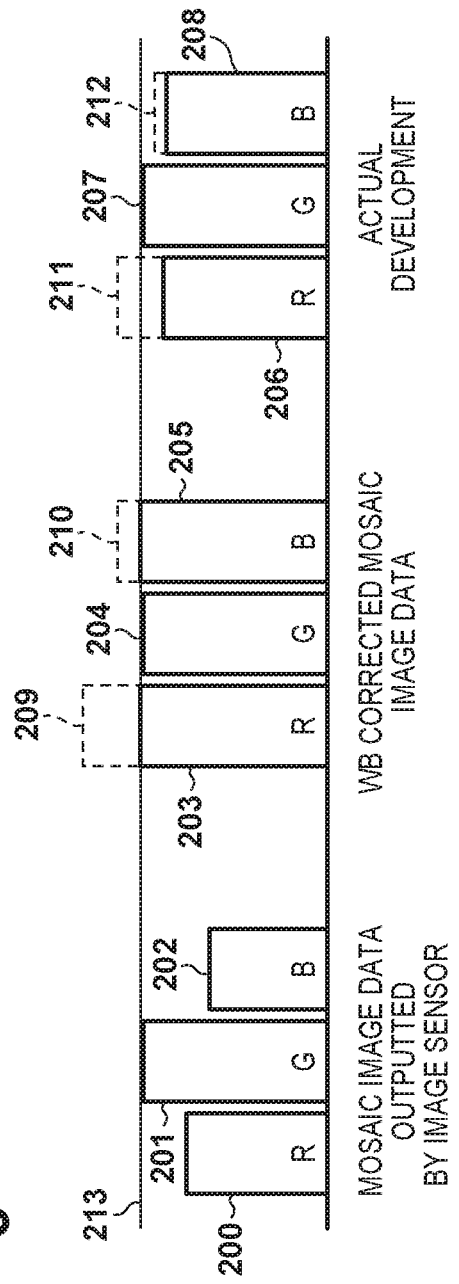

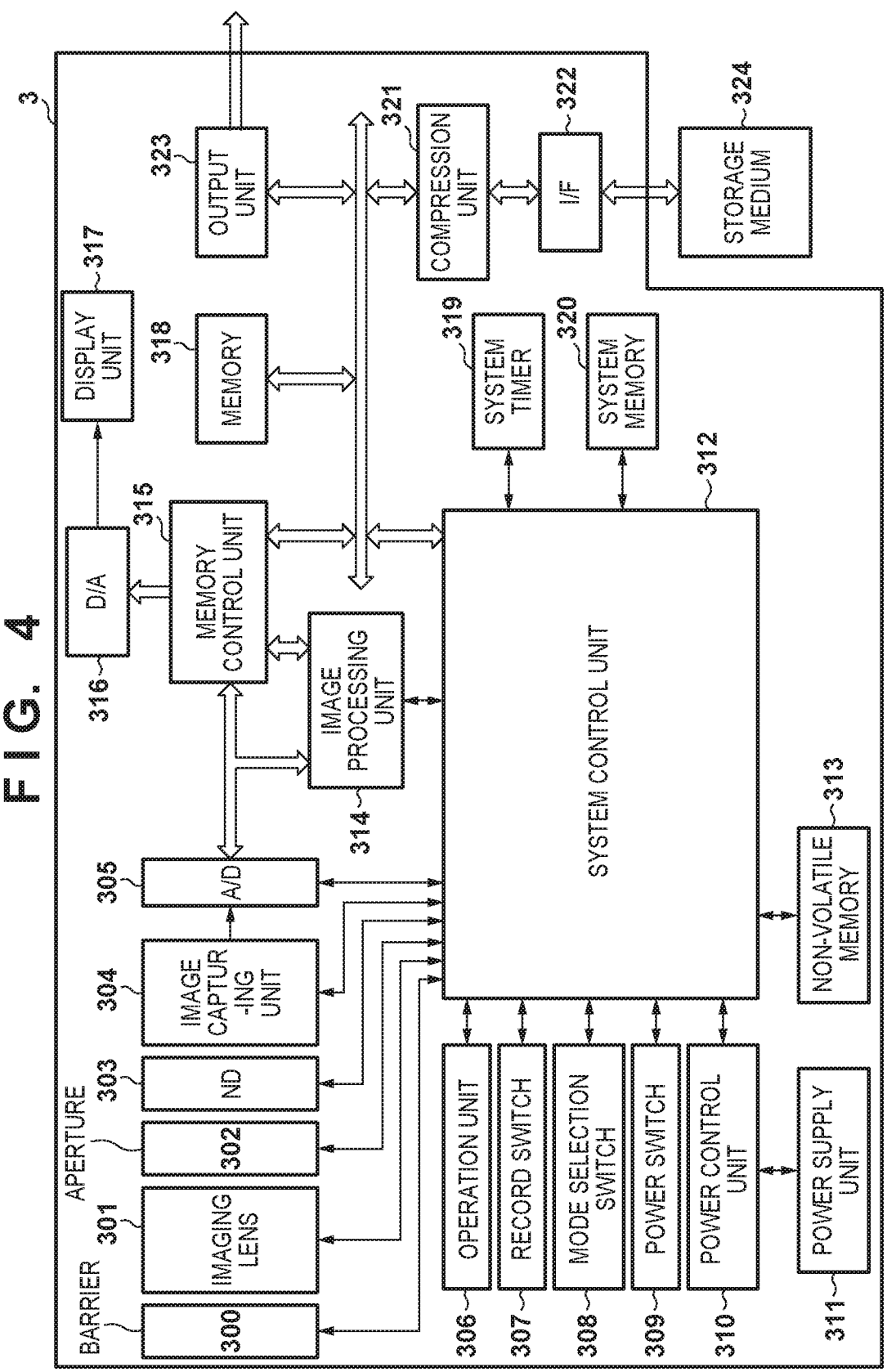

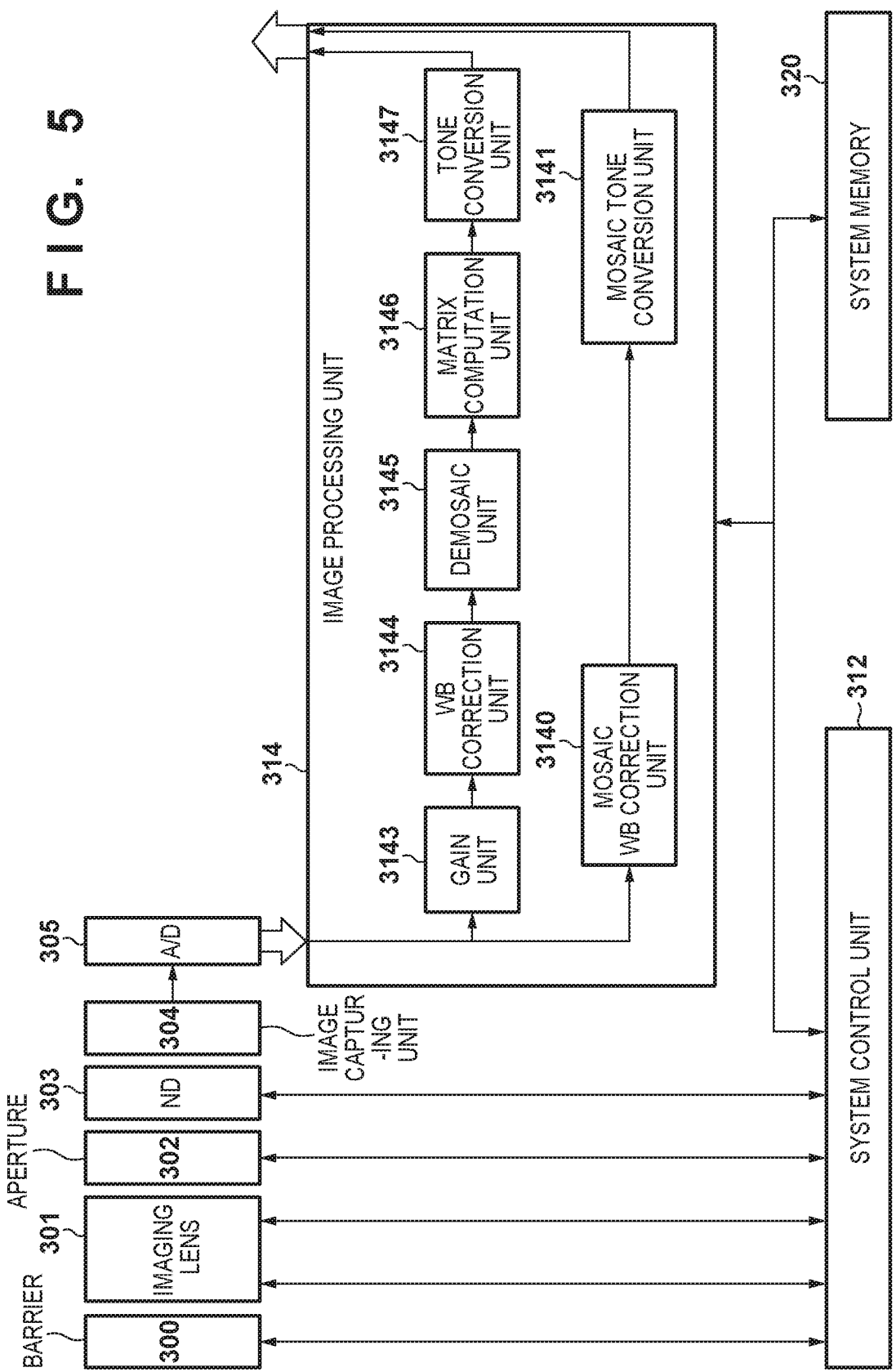

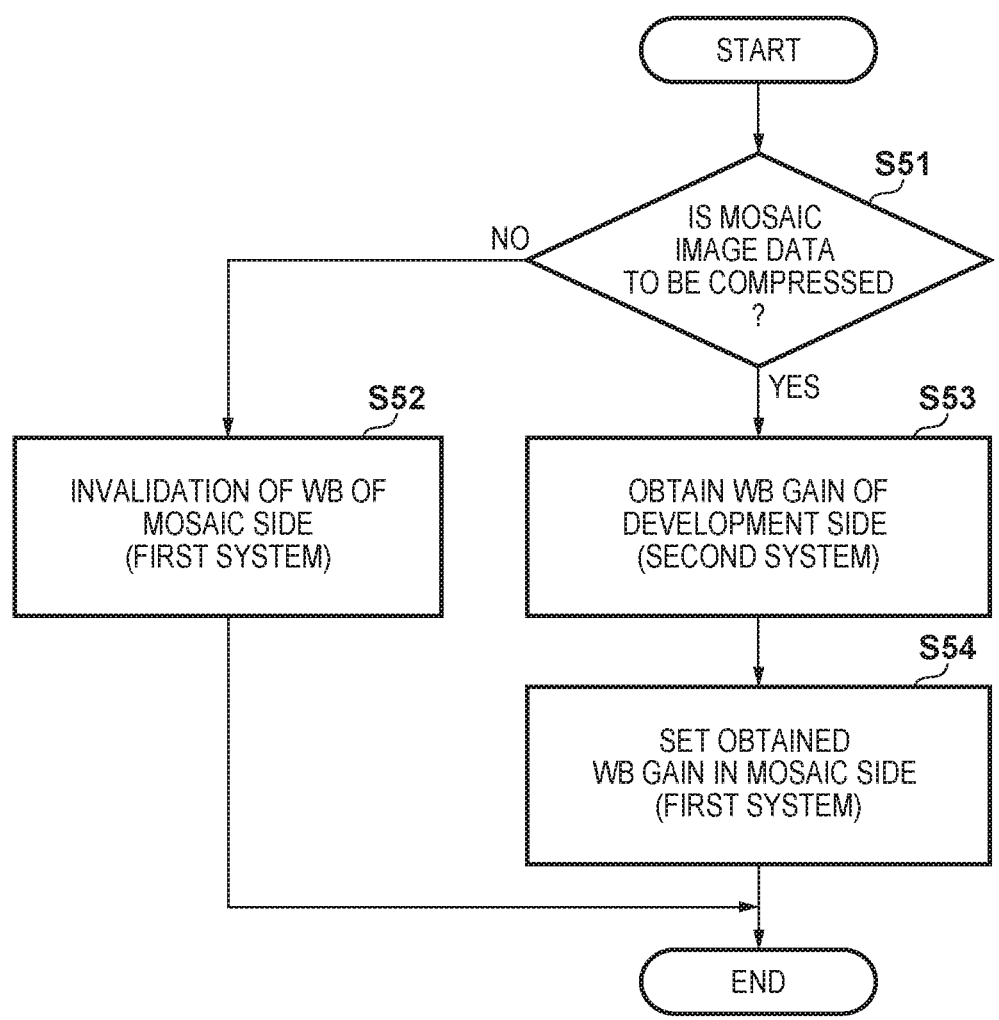

F I G. 11

| DATA COMPRESSION RATE | GRAY-WORLD HYPOTHESIS GAIN RATIO |
|---|---|
| 1/1 | 0.0 |
| 1/2 | 0.0 |
| 1/3 | 0.2 |
| 1/5 | 0.7 |
| 1/7 | 1.0 |

IMAGE PROCESSING APPARATUS, IMAGE PROCESSING METHOD, AND STORAGE MEDIUM

BACKGROUND OF THE INVENTION

Field of the Invention

The present invention relates to an image processing apparatus that performs white balance correction on an image signal.

Description of the Related Art

Conventionally, there are image capturing apparatuses that can record or output data after applying only simple signal processing on the output signal of an image sensor, in which R (red), G (green), and B (blue) pixels are arranged in a checkered pattern as in FIG. 1 or the like and which outputs mosaic image data (RAW data). In FIG. 1, reference numeral 71 denotes an R pixel, reference numeral 72 denotes a G pixel, and reference numeral 73 denotes a B pixel. Mosaic image data, as compared to signals that are recorded or output after application of signal processing within an image capturing apparatus in advance, has the merit that it is possible for a user to freely adjust the tint, brightness, or the like afterwards by development software that runs on a PC or actual development in a development function within the image capturing apparatus. From this perspective, it is desirable that as much as possible signal processing not be performed on mosaic image data. However, if mosaic image data is recorded, as is, uncompressed, the data amount will be large, and so high-speed and large capacity recording media will be necessary.

Meanwhile, there are image capturing apparatuses in recent years that incorporate a function by which they can compress mosaic image data and record it in comparatively low cost recording media. Consequently, while traditionally there was a high threshold with respect to mosaic image data recording and editing, it has come to be comparatively easy to do. However, there are cases in which, due to degradation of the mosaic image data due to compression, problems occur when a user later adjusts white balance.

FIG. 2 is a view that illustrates an example of a case where a white balance correction is not performed when recording mosaic image data. The reference numerals 100 to 102 denote R, G, and B signals outputted from an image sensor, and the reference numerals 103 to 105 denote R, G, and B signals of mosaic image data to which compression processing was applied. Also, the reference numerals 106 to 108 denote R, G, and B signals of images resulting from decompressing the compressed mosaic image data, performing a white balance correction, and then performing actual development. Also, reference numeral 109 denotes the error produced in the R signal at the time of data compression, and reference numeral 110 denotes a state in which the error 109 is amplified due to white balance correction at the time of actual development. In this way, in a case where a white balance correction is not performed when recording mosaic image data, error is produced in the R signal or the B signal due to the compression processing. Also, there is a possibility that error will be amplified and color reproducibility will worsen because the R or B signals are amplified at the time of white balance correction.

Meanwhile, FIG. 3 is a view that illustrates an example of a case where a white balance correction is performed when recording mosaic image data. Reference numerals 200 to 202 denote R, G, and B signals of mosaic image data outputted from an image sensor similarly to reference numerals 100 to 102 in FIG. 2. Reference numerals 203 to 205 denote R, G, and B signals of mosaic image data resulting from performing a white balance correction. Reference numerals 206 to 208 denote R, G, and B signals when actual development was performed by applying a negative white balance gain to the mosaic image data. Also, reference numeral 213 denotes an upper limit of the signal value, and reference numerals 209 and 210 denotes the R and B signals which are lost due to being clipped by the upper limit value. Reference numerals 211 and 212 denote what R and B signals would be at the time of actual development if the R and B signals 209 and 210 had not been lost. In the case where white balance correction is performed in advance at the time of mosaic image data recording, adjustment of white balance is a fine adjustment, and it is difficult to notice error amplification. However, there is a problem in the case of adjusting so as to apply negative gain to the R and B signals in that coloring will occur in saturated portions, and color reproduction deteriorates.

As one countermeasure for such a problem, in Japanese Patent Laid-Open No. 2014-110623, image processing is applied to mosaic image data that was once compressed/decompressed, and the image resulting from applying the image processing is compared against mosaic image data that has not been compressed/decompressed, and the compression ratio is controlled based on the result. By this, without performing white balance correction when recording mosaic image data, by compression ratio control, it is possible to solve a problem that occurs when a user later adjusts white balance.

However, in the method described in Japanese Patent Laid-Open No. 2014-110623, since it is necessary to simultaneously perform compression/decompression at the time of recording, there is a problem in that the system processing load increases. Also, since the data amount becomes larger if the compression ratio is lowered, there was a problem in that high-speed and large capacity recording media was needed.

SUMMARY OF THE INVENTION

The present invention is made in light of the foregoing problem, and provides an image processing apparatus that can reduce an amount of mosaic image data that is recorded and suppresses deterioration in image quality.

According to a first aspect of the present invention, there is provided an image processing apparatus, comprising: a white balance correction unit configured to perform a white balance correction by amplifying at least one color signal in relation to mosaic image data including a plurality of color signals outputted from an image sensor; a compression unit configured to compress the mosaic image data; and a control unit configured to control at least the white balance correction unit and the compression unit, wherein the control unit, in a case where compression by the compression unit is set to be off, controls the white balance correction by the white balance correction unit to be substantially invalid, and outputs the mosaic image data, and, in a case where compression by the compression unit is set to be on, controls the white balance correction by the white balance correction unit to be valid, and outputs the mosaic image data after the white balance correction.

According to a second aspect of the present invention, there is provided an image processing method, comprising: performing a white balance correction by amplifying at least one color signal in relation to mosaic image data including a plurality of color signals outputted from an image sensor; compressing the mosaic image data; and controlling at least the white balance correction and the compression, wherein in the controlling, in a case where the compression is set to be off, the white balance correction is controlled to be substantially invalid, and the mosaic image data is outputted, and, in a case where the compression is set to be on, the white balance correction is controlled to be valid, and the mosaic image data after the white balance correction is outputted.

According to a third aspect of the present invention, there is provided an image processing apparatus, comprising: a white balance correction unit configured to perform a white balance correction by amplifying at least one color signal in relation to mosaic image data including a plurality of color signals outputted from an image sensor; a compression unit configured to compress the mosaic image data; and a control unit configured to control at least the white balance correction unit and the compression unit, wherein the control unit, in a case where compression by the compression unit is performed, controls so that the lower a compression ratio of the compression is, the lower a correction strength of the correction by the white balance correction unit becomes, and outputs the mosaic image data after the white balance correction.

According to a fourth aspect of the present invention, there is provided an image processing method, comprising: performing a white balance correction by amplifying at least one color signal in relation to mosaic image data including a plurality of color signals outputted from an image sensor; compressing the mosaic image data; and controlling at least the white balance correction and the compression, wherein in the controlling, in a case where the compression is performed, control is performed so that the lower a compression ratio of the compression is, the lower a correction strength of the white balance correction becomes, and the mosaic image data after the white balance correction is outputted.

Further features of the present invention will become apparent from the following description of exemplary embodiments with reference to the attached drawings.

BRIEF DESCRIPTION OF THE DRAWINGS

FIG. 1 is a view illustrating an arrangement of pixels of an image sensor.

FIG. 2 is a view illustrating a flow up until development when mosaic image data is compressed.

FIG. 3 is a view illustrating a flow up until development when white balance correction is performed in advance on the mosaic image data.

FIG. 4 is a block diagram illustrating an internal configuration of a digital video camera 3 which is the first embodiment of the present invention.

FIG. 5 is a block diagram illustrating a configuration of an image processing unit.

FIG. 6 is a flowchart illustrating a method of setting a white balance gain in the first embodiment.

FIG. 11 is a view illustrating a method of determining a white balance gain in the third embodiment.

DESCRIPTION OF THE EMBODIMENTS

Figure 1:
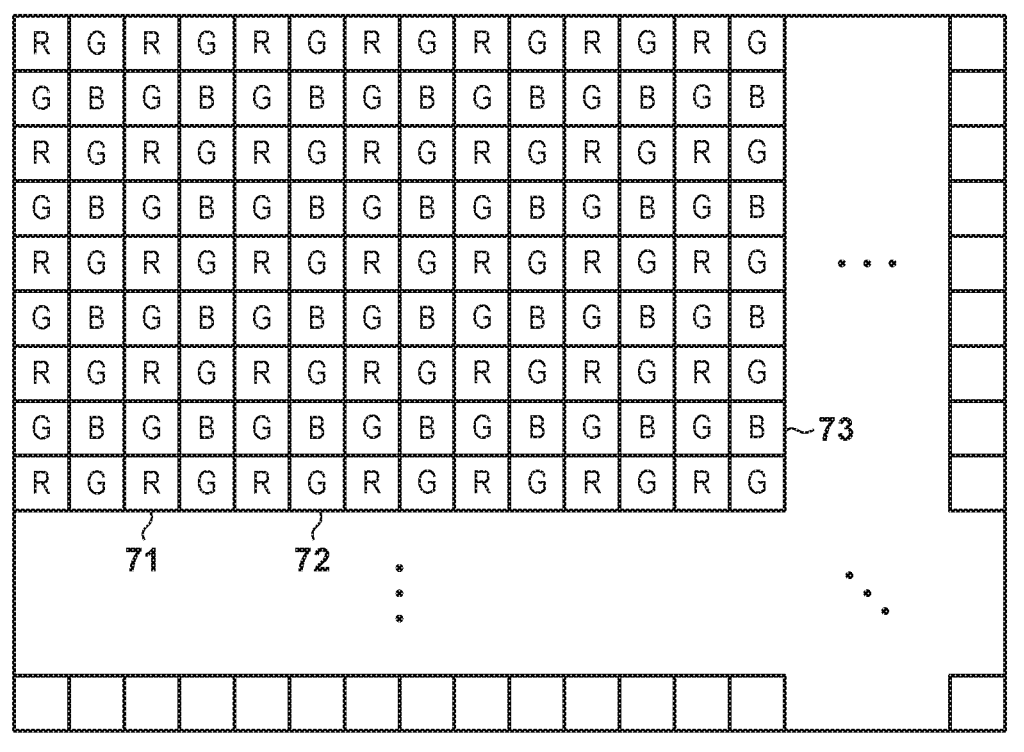
Figure 7:
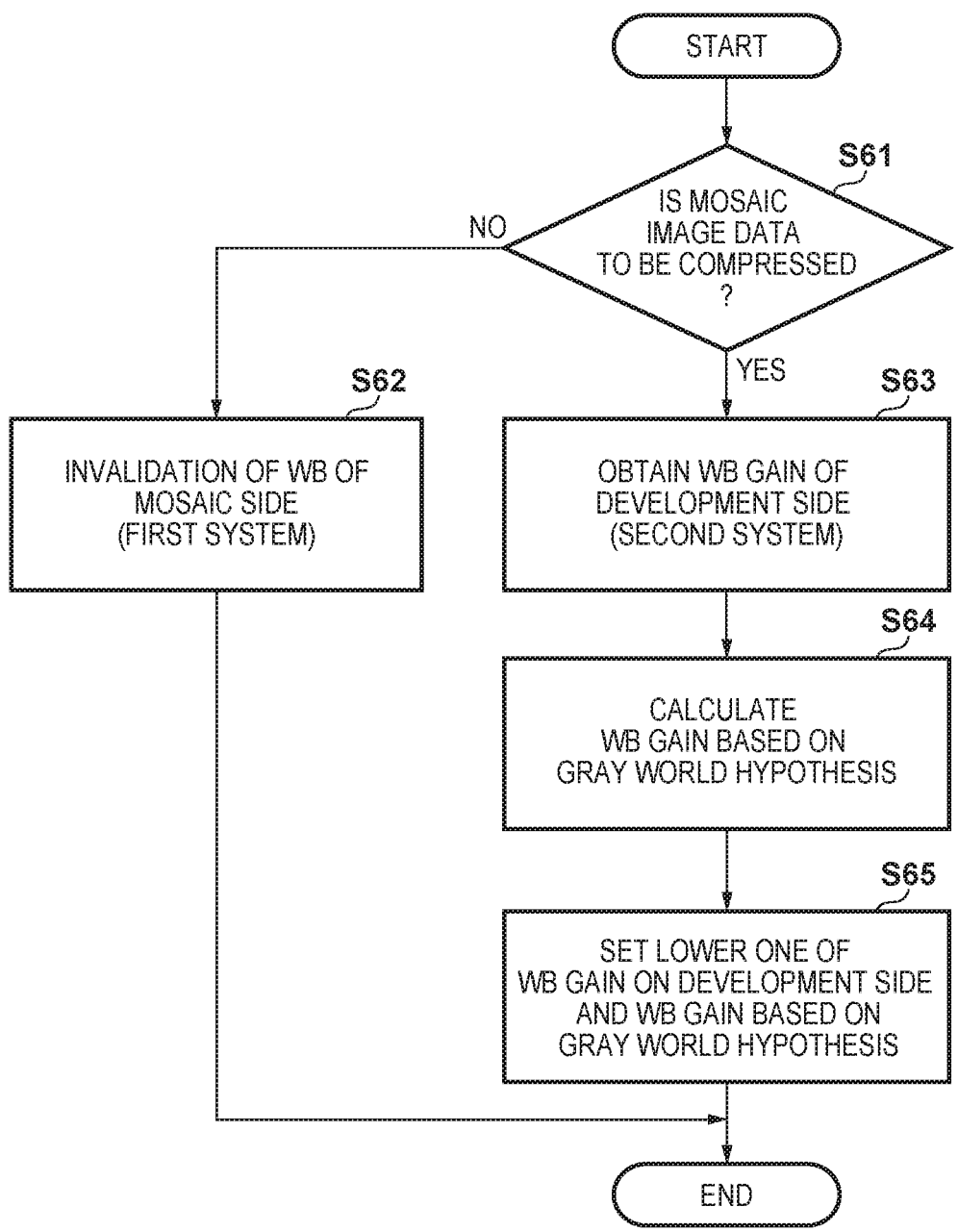
FIG. 7 is a flowchart illustrating a method of setting a white balance gain in a second embodiment.

Hereinafter, referring to the attached drawings, embodiments of the present invention will be described in detail. In the embodiments hereinafter, a case of applying the present invention to an image processing unit in a digital video camera is described as an example, but the present invention is not limited to image processing in an image capturing apparatus, and can be applied to a general-purpose image processing unit. Note that in the following embodiments, an arrangement of pixels of an image sensor is the same as is illustrated in FIG. 1, and the state of image data for white balancing and data compression is as in FIG. 2 and FIG. 3, and so description will be given using FIG. 1, FIG. 2, and FIG. 3 in the embodiments below.

First Embodiment

FIG. 4 is a block diagram illustrating an internal configuration of a digital video camera 3 which is a first embodiment of the present invention. The digital video camera 3, as described later, is an image capturing apparatus that can output mosaic image data that is outputted from an image sensor in a compressed state and in an uncompressed state.

In FIG. 4, an image capturing lens 301 is a lens group including a zoom lens and a focus lens, and the image capturing lens 301 causes a subject image to be formed. An aperture 302 is an aperture used for adjusting an amount of light. An ND 303 is an ND filter used for reducing light. An image capturing unit 304 has an image sensor configured by a CCD or CMOS element that converts an optical image into an electrical signal. The image sensor has a pixel arrangement as illustrated in FIG. 1. Also, the image capturing unit 304 comprises a function that controls a storage by an electronic shutter and functions for changing an analog gain, a speed for reading out, or the like. An A/D converter 305 converts an analog signal outputted from the image capturing unit 304 into a digital signal. A barrier 300 prevents dirtying and breakage of an image capturing system including the image capturing lens 301, the aperture 302, the ND 303, and the image capturing unit 304 by covering the image capturing system including the image capturing lens 301 in the digital video camera 3.

An image processing unit 314 performs color conversion processing on data from the A/D converter 305 or data from a memory control unit 315, gamma correction processing, and digital gain addition processing, or the like. Also, predetermined computational processing is performed using captured image data, and the computation result is transmitted to a system control unit 312. The system control unit 312 performs exposure control, ranging control, and white balance control based on the transmitted computation result. Thereby, TTL (through-the-lens) type AF (auto focus) processing, AE (auto exposure) processing, AWB (auto white balance) processing, and the like are performed. Details of the image processing unit 314 are described later.

The data outputted from the A/D converter 305, via the image processing unit 314 and the memory control unit 315, or via memory control unit 315, is written directly into a memory 318. The memory 318 stores image data that was captured by the image capturing unit 304 and converted into digital data by the A/D converter 305 and image data for displaying to a display unit 317. The memory 318 comprises sufficient storage capacity to store a predetermined amount of time's worth of moving images and voice, or a predetermined number of still images.

The memory 318 also serves as a memory for image display (video memory). A D/A converter 316 converts data for image display that is stored in the memory 318 into an analog signal, and supplies it to the display unit 317. In this way, the image data for display that is written to the memory 318 is displayed by the display unit 317 via the D/A converter 316. The display unit 317 performs, on a display device such as an LCD, a display in accordance with an analog signal from the D/A converter 316. By consecutively analog-converting in the D/A converter 316 a digital signal, which was stored in the memory 318 after once being A/D converted by the A/D converter 305, and displaying it by transferring it to the display unit 317, it is possible to realize an electronic viewfinder function, and it is possible to perform a through image display.

A non-volatile memory 313 is an electrically deletable/recordable memory, and for example, an EEPROM is used therefor. Constants, programs, and the like for operation of the system control unit 312 are stored in the non-volatile memory 313. A program here is a program that is for executing the various flowcharts described later in the embodiments of the present invention.

The system control unit 312 controls the digital video camera 3 as a whole. By executing a program recorded in the non-volatile memory 313 as previously described each process described later is realized. A RAM is used for a system memory 320, and constants, variables, and programs read out from the non-volatile memory 313 for operation of the system control unit 312 are loaded thereinto. Also, the system control unit 312 performs display control by controlling the memory 318, the D/A converter 316, the display unit 317, and the like.

A system timer 319 is a timer unit for measuring time periods used for various control and time periods of an integrated clock. A mode selection switch 308, a record switch 307, and an operation unit 306 are operation units for inputting various operation instructions to the system control unit 312.

The mode selection switch 308 switches an operation mode of the system control unit 312 to one of a moving image recording mode, a still image recording mode, a playback mode, or the like. As modes included in the moving image recording mode and the still image recording mode, there are an auto capturing mode, an auto scene discrimination mode, a manual mode, modes for various scenes which are image capturing settings for each capturing scene, a program AE mode, a custom mode, or the like. By the mode selection switch 308, a direct switch is made into one of the modes included in the moving image capturing mode. Alternatively, configuration may be taken so as switch, by using another operation member, to one of the modes included in the moving image capturing mode after first switching to the moving image capturing mode by the mode selection switch 308. The record switch 307 switches between an image capture standby state and an image capture state. The system control unit 312, in accordance with an operation of the record switch 307, starts a sequence of operations from reading out of a signal from the image capturing unit 304 until writing out of moving image data to a storage medium 324.

A power switch 309 is a switch for turning on/off a power supply of the digital video camera 3. Each operation member of the operation unit 306, by an operation of selecting one of a variety of function icons that are displayed on the display unit 317 or the like is assigned an appropriate function in each scene, and acts as a function button. As function buttons, there is a terminate button, a back button, an image scrolling button, a jump button, a narrow-down button, an attribute modify button, or the like, for example. For example, when a menu button is pressed, various settable menu screens are displayed on the display unit 317. A user can intuitively perform various settings by using a menu screen displayed on the display unit 317, up, down, left, and right 4-way directional arrow keys, and a SET button.

A power control unit 310 is configured by, for example, a battery detection circuit, a DC-DC converter, and a switch circuit for switching which blocks to energize, and the power control unit 310 detects whether a battery is attached, a type of the battery, and a remaining capacity of the battery. Also, the power control unit 310, based on the detection results and an instruction by the system control unit 312, controls the DC-DC converter and supplies each unit, which includes the storage medium 324, with a necessary voltage for a necessary time period. A power supply unit 311 comprises a primary battery such as an alkaline battery or a lithium battery, a secondary battery such as an NiCd battery, an NiMH battery, or an Li-ion battery, an AC adapter, or the like.

A compression unit 321 performs image data compression processing. The system control unit 312 is able to switch between validity (on) and invalidity (off) of compression processing of the compression unit 321. An I/F 322 is an interface for the storage medium 324, which may be a memory card or a hard disk, or an external output device. In FIG. 4, a state of connection with the storage medium 324 is illustrated. A storage medium 324 is a storage medium such as a memory card for recording images that were captured, and the storage medium 324 is configured from a semiconductor memory, a magnetic disk, or the like.

Next, an internal configuration of the image processing unit 314 in the present embodiment will be described. FIG. 5 is a block diagram illustrating an internal configuration of the image processing unit 314 and related parts. Normally, processing such as sharpness control is performed by this part, but the indication of the configuration therefor is abbreviated because it is unnecessary in the description of the present embodiment. Note that each block in the image processing unit 314 can obtain various data in the image capturing apparatus through the system control unit 312. Also, the image processing unit 314 includes two systems: a first system for performing image processing in relation to mosaic image data that has a plurality of color signals and that is to be recorded or outputted, and a second system for performing image processing including demosaicing processing and outputting a developed image. The mosaic image data (RAW data that is not developed) is outputted to the outside of the image processing unit 314 via the first system. Also, developed image data is outputted to the outside of the image processing unit 314 via the second system.

First, the first system which performs image processing on the mosaic image data to be recorded or outputted will be described.

A mosaic WB correction unit 3140 performs a white balance correction on a signal outputted from the A/D converter 305. In the image capturing unit 304, typically, the sensitivities of R (red) and B (blue) are lower compared to the sensitivity of G (green), and therefore white balance correction is performed by applying a gain to the R signal and the B signal. A mosaic tone conversion unit 3141 performs tone conversion on each of the R, G, and B signals of the mosaic image data. Thereby, the bit length is compressed, and the data amount of the mosaic image data is reduced.

Next, the second system which is for performing image processing on a development side including in demosaicing will be described. A gain unit 3143 performs processing for amplifying a signal by applying gain uniformly to each of the R, G, and B signals. With this, it is possible to perform control of an ISO sensitivity or the like. A WB correction unit (white balance correction unit) 3144 performs a white balance correction on a signal outputted from the gain unit 3143. Since the R, G, and B signals are amplified uniformly by the same gain in the gain unit 3143, a WB correction unit 3144, similarly to the mosaic WB correction unit 3140, performs white balance correction (gain determination unit) by applying a gain to the R signal and the B signal.

A demosaicing unit 3145 applies demosaicing processing to a signal outputted from the WB correction unit 3144. A matrix computation unit 3146 performs correction of color tone by applying a matrix to the R, G, and B signals. A tone conversion unit 3147 performs a tone conversion using uniform input-output characteristics on each of the R, G, and B signals outputted from the matrix computation unit 3146.

Continuing on, using the flowchart of FIG. 6, a method of determining a white balance gain in the mosaic WB correction unit 3140 in a first system that handles mosaic image data will be described.

Firstly, in step S51, information as to whether or not to compress and record the mosaic image data is obtained. This corresponds to obtaining information as to whether or not the compression unit 321 is valid when recording the mosaic image data to the storage medium 324. Also, data compression here means lossy data compression that is accompanied by signal degradation. Because the system control unit 312 controls whether or not to perform data compression by the compression unit 321, it is possible to obtain information as to whether or not to perform data compression within the system control unit 312. Furthermore, there are cases in which mosaic image data is outputted from an output unit 323 without recording it to the storage medium 324. For example, there are cases such as when mosaic image data is outputted as an SDI output. At that time, an uncompressed signal is outputted because the compression unit 321 is not passed through. For this reason, it is possible to treat the data as not having been compressed. Step S52 is advanced to in the case where data compression is not to be performed, and step S53 is advanced to in the case where data compression is to be performed.

In step S52, the mosaic WB correction unit 3140 is invalidated by control from the system control unit 312. This means the same thing as applying the gain at a factor of 1 to each of the R and B signals, and therefore the white balance gain may be set at a factor of 1 in relation to the mosaic WB correction unit 3140 from the system control unit 312. With this, the state will be such that the white balance will not have been corrected when recording the mosaic image data similarly to the case of FIG. 2, but since data compression will not be performed by the compression unit 321, the error due to data compression will not occur. Accordingly, a deterioration in the color reproducibility will not occur even if a white balance correction is performed at the time of actual development. Also, since there is basically no positive gain correction, there is no occurrence of a saturated portion coloring that occurs in the negative gain correction as described in FIG. 3.

In step S53, a white balance gain that has been set in the WB correction unit 3144 is obtained. Since the white balance gain that has been set in the WB correction unit 3144 is a white balance gain that is being monitored when the user performs image capturing, it can be considered that the intention of the user at the time of capturing is reflected therein. Because this white balance gain has been set by the system control unit 312, it can be obtained by software that is running in the system control unit 312, for example. The method of determining the white balance gain that is set in the WB correction unit 3144 may be to make a determination according to the user designating the color temperature or the like, and may be to make a determination according to selection of a type of light source such as daylight. Also, it may be an automatic determination based on a gray card or the like, and it may be a determination according to an auto white balance that controls the white balance automatically depending on the scene.

In step S54, the white balance gain obtained in step S53 is set in the mosaic WB correction unit 3140. With this, the same white balance gain as in the WB correction unit 3144 is set in the mosaic WB correction unit 3140. Consequently, the degree of freedom of white balance gain at the time of actual development will be reduced, but, as discussed in the description of step S53, it can be considered that the intention of the user at the time of image capturing will be reflected in the white balance gain. Accordingly, a small white balance correction should be enough at the time of actual development, and it is possible to avoid a deterioration in the color reproducibility that arises due to applying a large white balance gain at the time of actual development.

By virtue of the present embodiment, the white balance gain is not set (a white balance correction is not performed) in a case where mosaic image data is recorded or outputted without compression. In other words, in the case of outputting mosaic image data in an uncompressed state, control is performed such that white balance correction is substantially invalidated. Accordingly, it is possible to largely maintain a degree of freedom for the user to change the white balance gain at the time of actual development by using a development function in an image capturing apparatus or software running on a PC. Also, it is possible to avoid an error due to lossy compression on the mosaic image data from occurring. Also, in the case of compressing mosaic image data and then recording or outputting it, white balance correction processing is made to be valid, and by setting the white balance gain to be the same value as the white balance gain on the development side and outputting data after white balance correction, it is possible to avoid the error due to data compression being amplified, and to maintain color reproduction accuracy.

Second Embodiment

In the first embodiment, it was described that in a case of recording or outputting without compressing mosaic image data, a white balance correction is not performed on the mosaic image data, and that in the case of compression the same white balance gain as on the development side is set. In the present embodiment, description will be given of a method for setting the white balance gain for mosaic image data by a method that is different to the first embodiment in the case of compressing the mosaic image data and then recording or outputting it.

The processing in the present embodiment is described using the flowchart of FIG. 7. Because step S61 to step S63 are similar to step S51 to step S53 in the first embodiment, description thereof is omitted.

In step S64, a white balance gain based on the gray world hypothesis is calculated. A gray world hypothesis is a hypothesis that the average of all object colors is gray, and in the present embodiment, it is hypothesized that the average color of the whole image that was captured by the image capturing unit 304 is gray, and a white balance gain is calculated such that the levels of the plurality of color signals substantially match. Consider the case of a mosaic image as in FIG. 1. Because the number of G pixels is twice that of the R pixels and the B pixels, given that the total of the R pixels is Rsum, the total of the G pixels is Gsum, and the total of the B pixels is Bsum, a white balance gain WBR of R and a white balance gain WBB of B are obtained by the following equations.

$$WBR=(Gsum/2)/Rsum$$

$$WBB=(Gsum/2)/Bsum \qquad \text{(Equation 1)}$$

By the white balance gains based on the gray world hypothesis, the variation in distribution between R, G, and B is minimized, and therefore it is advantageous from the perspective of data compression.

In step S65, the lower gain among the white balance gain on the development side (second system side) obtained in step S63 and the white balance gain based on the gray world hypothesis calculated in step S64 is set as the white balance gain of the mosaic image processing system (first system). Specifically, the white balance gain on the development side and the white balance gain based on the gray world hypothesis are compared for R and B respectively, and setting is performed as in FIG. 8.

Figure 8:
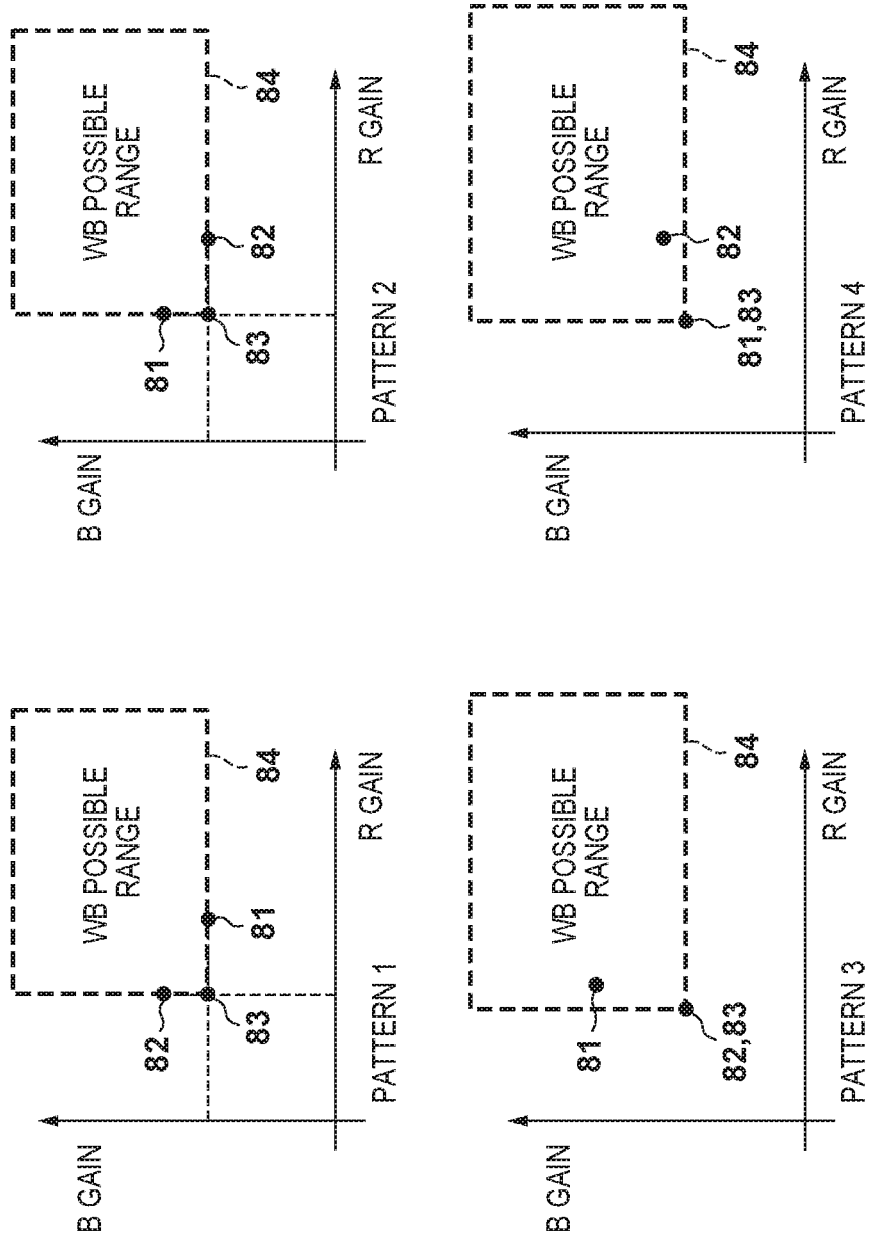
FIG. 8 is a view illustrating a method of determining a white balance gain in a second embodiment.

In FIG. 8, a development side WB gain 81 denotes the white balance gain obtained in step S63 and a gray world WB gain 82 denotes the white balance gain calculated in step S64. Also, a mosaic image WB gain 83 denotes the white balance gain set in step S65. Also, a WB possible range 84 denotes a white balance gain range in which a saturated portion coloring problem will not arise at the time of later actual development of the mosaic image.

By the positional relationship between the development side WB gain 81 and the gray world WB gain 82, four patterns can be considered. Pattern 1 denotes the case where for the R gain, the development side WB gain 81>the gray world WB gain 82 and for the B gain, the development side WB gain 81<the gray world WB gain 82. Pattern 2 denotes the case where for the R gain, the development side WB gain 81<the gray world WB gain 82 and for the B gain, the development side WB gain 81>the gray world WB gain 82. Pattern 3 denotes the case where the development side WB gain 81>the gray world WB gain 82 for both the R and B gains, and pattern 4 is the inverse of this.

In the case of any of the patterns 1 to 4, as illustrated in the WB possible range 84, both the development side WB gain 81 and the gray world WB gain 82 are included in the WB possible range 84, and it is guaranteed that saturated portion coloring will not arise at the time of actual development. Also, the white balance gain of the mosaic image data will be determined from both the perspective of the user's intention at the time of image capturing and data compression. Accordingly, it is possible to improve both data compression efficiency and the degree of freedom of the white balance gain at the time of actual development in the case where the white balance gain based on the gray world hypothesis is lower. Even if that is not the case, it is possible to set the white balance gain so as to enhance data compression efficiency while guaranteeing up to the white balance gain at the time of image capturing at a minimum.

In the second embodiment above is described a method of setting, as the mosaic image WB gain 83, the lower out of the gray world WB gain 82 and the WB gain 81 of the development side as the white balance gain on the mosaic image side. By virtue of the present embodiment, it becomes possible to set the white balance gain considering data compression and efficiency while broadening the white balance gain range in which saturated portion coloring will not arise at the time of actual development.

Third Embodiment

Figure 9:
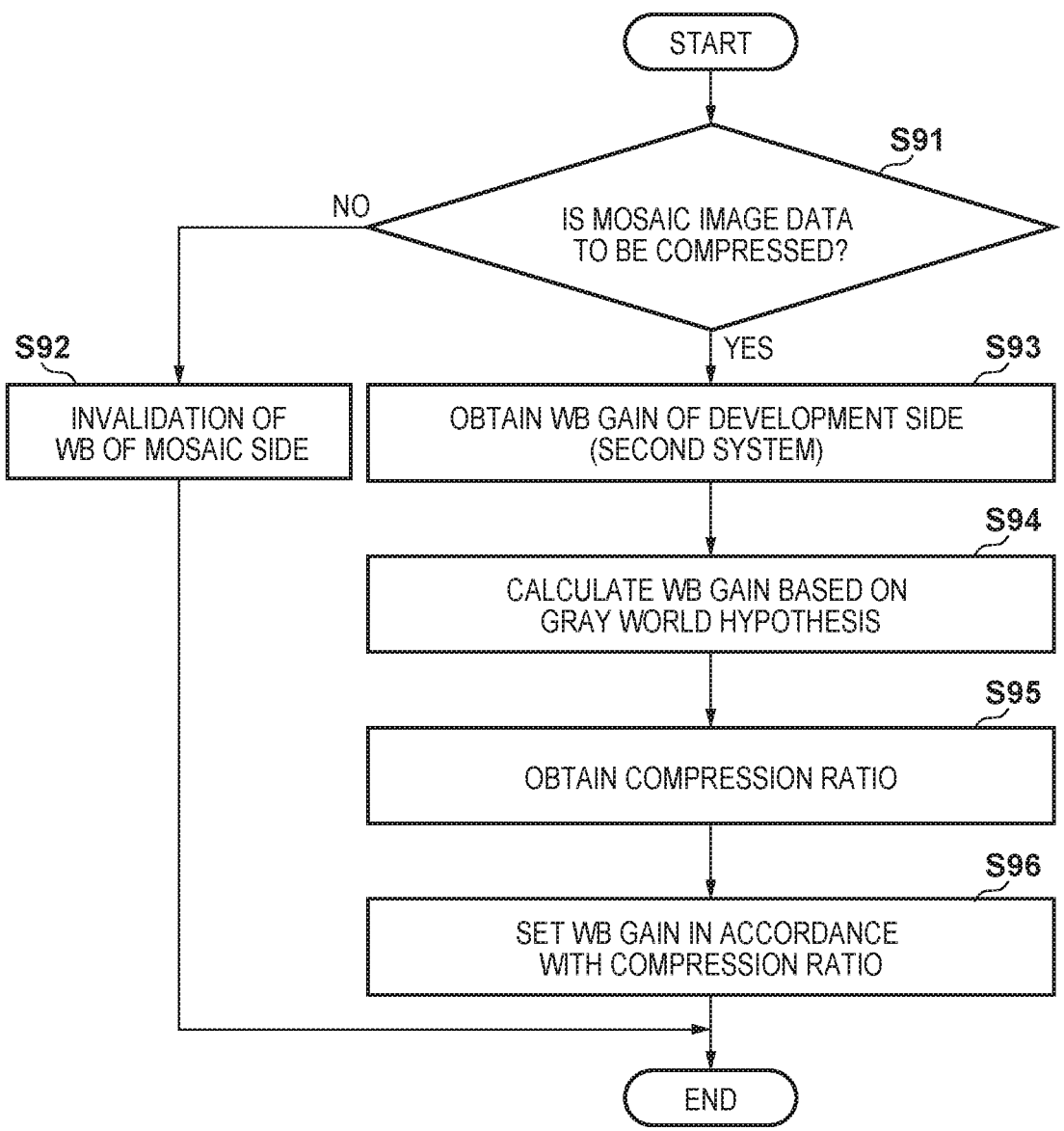
FIG. 9 is a flowchart illustrating a method of setting a white balance gain in a third embodiment.

In the present embodiment, description is given, with reference to the flowchart of FIG. 9, for a case in which it is possible to set the compression ratio of mosaic image data compression in advance, and in which white balance gain is controlled to be set in the mosaic WB correction unit 3140 in accordance with the compression ratio.

Because step S91 to step S94 are similar to step S61 to step S64 in the second embodiment, description thereof is omitted.

In step S95, the mosaic image data compression ratio is obtained. The compression ratio may be set by a user through the operation unit 306 in advance, and may be set automatically by the system control unit 312. Note that in the present embodiment it is assumed that 1/1, 1/2, 1/3, 1/5, and 1/7 can be selected as compression ratios, but in actual embodiments other compression ratio may be selectable.

In step S96, in accordance with the compression ratio obtained by step S95, a white balance gain to be applied by the mosaic WB correction unit 3140 is determined and set. Regarding the method of determining the white balance gain, it may be determined using the white balance gain of the second system obtained in step S93 and the white balance gain based on the gray world hypothesis obtained in step S94.

Figure 10:
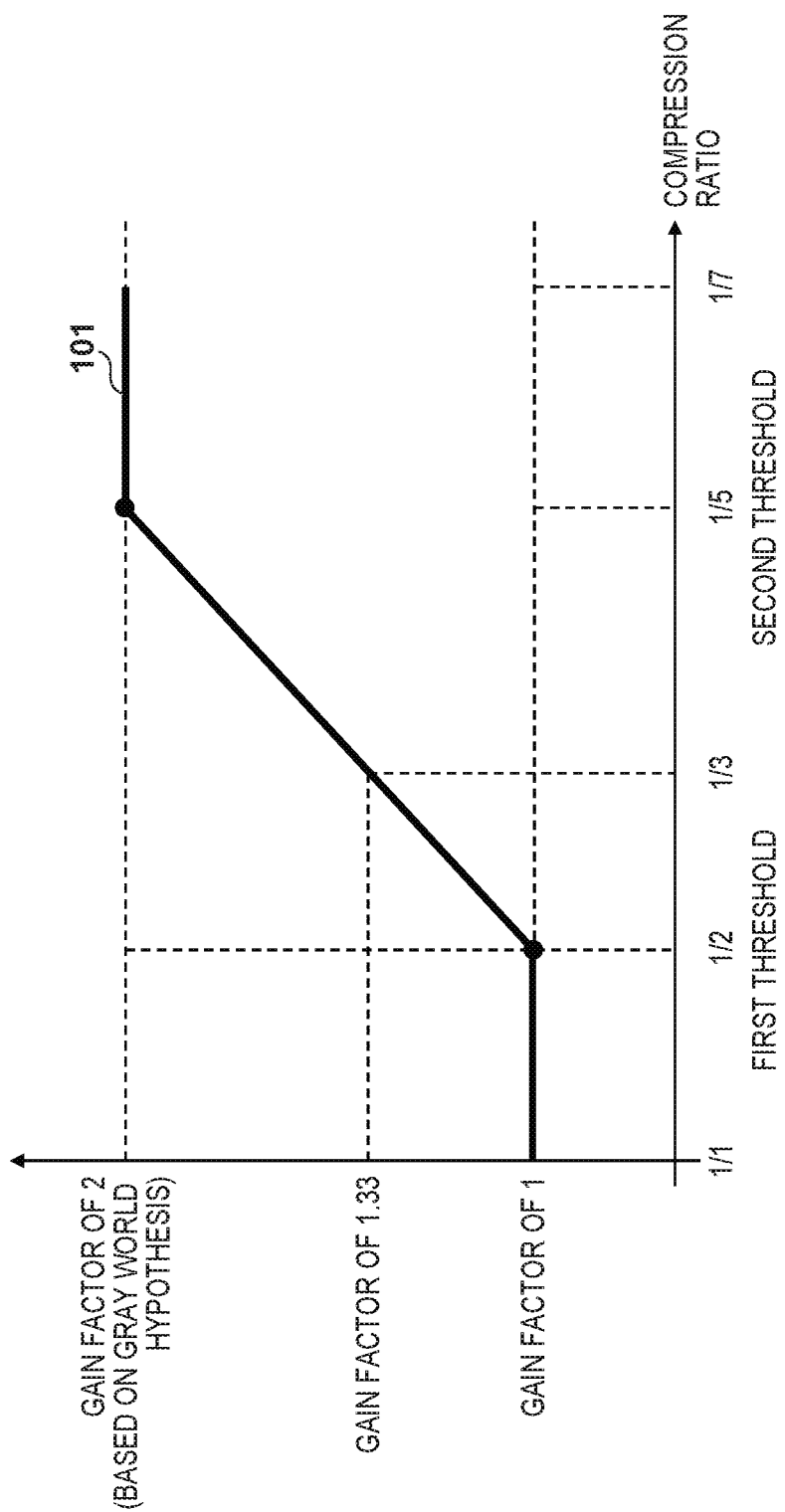
FIG. 10 is a view illustrating a method of determining a white balance gain in the third embodiment.

For example, a method of controlling the white balance gain in accordance with a linear graph by using a white balance gain based on the gray world hypothesis as in reference numeral 1001 of FIG. 10 can be considered. Here, the white balance gain is made to be a factor of 1 for compression ratios that are smaller than a first threshold, and the degree of freedom of the white balance gain at the time of actual development is maximized. In FIG. 10, this corresponds to regions whose compression ratio is smaller than the compression ratio 1/2. Also, for compression ratios larger than the second threshold, data compression efficiency is maximized by setting the white balance gain to a numeric value based on the gray world hypothesis. Also, in compression ratios between the two thresholds, the white balance gain is determined by interpolation. In FIG. 10, the white balance gain is determined by a linear interpolation, but the interpolation method is not limited to linear interpolation and may be a nonlinear interpolation.

Also, as another method, a method of determining the white balance gain by referring to a table as in FIG. 11 can be considered. In the table of FIG. 11, gain ratios defined for each gain in advance are stored. A white balance gain based on the gray world hypothesis is made to be a factor of 2 similarly to the previously described example. Here, letting the gray-world hypothesis gain ratio corresponding to the data compression rate be r and the white balance gain to be applied to the mosaic image to be gain, gain=2r+(1−r). For example, with a compression ratio of 1/2, gain=2×0.0+(1−0.0)=1.0, and so the white balance gain is a factor of 1.0. Also, with a compression ratio of 1/3, gain=2×0.2+(1−0.2)=1.2, and so the white balance gain is a factor of 1.2.

By calculating and setting the white balance gain in accordance with the data compression rate by the method described above, it is possible to change the value of the white balance gain for each data compression rate.

In the third embodiment above, a method of controlling to set the white balance gain of the mosaic image in accordance with the compression ratio of the mosaic image data is described. By virtue of the present embodiment, by setting the white balance gain lower (low correction strength in the white balance correction) in the case where the compression ratio is low and data compression efficiency is not prioritized, it is possible to increase the degree of freedom of the white balance gain at the time of actual development. Also, in the case where the compression ratio is high and data compression efficiency must be prioritized, it is possible to enhance the data compression efficiency by sacrificing the degree of freedom of the white balance gain at the time of actual development.

Although the present invention was explained in detail above based on suitable embodiments thereof, the present invention is not limited to these specific embodiments, and various forms of a scope that does not deviate from the gist of this invention are included in the invention. Some embodiments described above may be appropriately combined.

For example, in the second embodiment, the lower of the white balance gain based on the gray world hypothesis and the white balance gain on the development side is set as the mosaic image white balance gain, but a white balance gain other than one based on the gray world hypothesis may be used as a reference. For example, a minimum R gain and B gain (fixed values) in a color temperature range of 3200K to 8000K or the like may be used as a reference. By such a configuration, when the development side is a lower gain than this, saturated portion coloring can be prevented up to that white balance gain at the time of actual development, and saturated portion coloring can be prevented in the range of 3200K to 8000K when the gain is higher than that. However, because it is possible to consider the white balance correction amount at the time of actual development becoming larger than in the second embodiment, amplification of the error due to white balance correction becomes larger.

Also, rather than the white balance gain based on the gray world hypothesis, a white balance gain according to auto white balance that automatically corrects the white balance depending on the scene may be used instead.

Furthermore, applying to a mosaic image a white balance gain that is slightly lower than the white balance gain determined in the first and second embodiments can be considered. In such a case, while this is a negative from the perspective of data compression, it is possible to guarantee a white balance gain margin at the time of development, and the degree of freedom is improved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-046509, filed Mar. 10, 2017, which is hereby incorporated by reference herein in its entirety.

What is claimed is:

1. An image processing apparatus, comprising:
at least one processor or circuit configured to function as following units:
a white balance correction unit configured to perform a white balance correction by amplifying at least one color signal in relation to mosaic image data including a plurality of color signals outputted from an image sensor;
a compression unit configured to compress the mosaic image data and obtain compressed mosaic image data; and
a control unit configured to control at least the white balance correction unit and the compression unit,
wherein the control unit,
in a case where compression by the compression unit is set to be off, controls the white balance correction by the white balance correction unit to be substantially invalid, and outputs the mosaic image data, and,
in a case where compression by the compression unit is set to be on, controls the white balance correction by the white balance correction unit to be valid, and outputs the mosaic image data after the white balance correction.

2. The image processing apparatus according to claim 1, wherein the at least one processor or circuit is configured to further function as a first gain determination unit configured to determine a first gain for amplifying the color signal by a calculation method set by a user, wherein the control unit controls the white balance correction unit to perform the white balance correction by using the first gain in a case where compression of the mosaic image data by the compression unit is turned on.

3. The image processing apparatus according to claim 2, wherein the first gain determination unit determines the first gain based on a color temperature that a user set.

4. The image processing apparatus according to claim 2, wherein the first gain determination unit determines the first gain based on a type of light source that a user selected.

5. The image processing apparatus according to claim 2, wherein the first gain determination unit determines the first gain to be a value calculated automatically from a plurality of color signals included in the mosaic image data.

6. The image processing apparatus according to claim 1, wherein the at least one processor or circuit is configured to further function as following units:
a first gain determination unit configured to determine a first gain for amplifying the color signal by a calculation method set by a user;
and a second gain determination unit configured to determine a second gain that is different to the first gain,
wherein the control unit, in a case where compression of the mosaic image data by the compression unit is turned on, controls the white balance correction unit to perform the white balance correction by using the lower gain out of the first gain and the second gain.

7. The image processing apparatus according to claim 6, wherein the second gain determination unit determines the second gain to be a value such that each of the levels of the plurality of color signals substantially match in a case where the white balance correction was performed on the mosaic image data.

8. The image processing apparatus according to claim 6, wherein the second gain determination unit determines the second gain to be a value calculated automatically from a plurality of color signals included in the mosaic image data.

9. The image processing apparatus according to claim 6, wherein the second gain determination unit determines the second gain to be a fixed value that is defined in advance.

10. The image processing apparatus according to claim 1, wherein the mosaic image data is mosaic image data obtained from the image sensor which is configured such that red pixels, green pixels, and blue pixels are arranged thereon in a checkered pattern.

11. The image processing apparatus according to claim 10, wherein the white balance correction unit performs a white balance correction by amplifying a color signal of the red pixels and a color signal of the blue pixels.

12. An image processing method, comprising:
performing a white balance correction by amplifying at least one color signal in relation to mosaic image data including a plurality of color signals outputted from an image sensor;
compressing the mosaic image data and obtaining compressed mosaic image data; and
controlling at least the white balance correction and the compression,
wherein in the controlling,
in a case where the compression is set to be off, the white balance correction is controlled to be substantially invalid, and the mosaic image data is outputted, and,
in a case where the compression is set to be on, the white balance correction is controlled to be valid, and the mosaic image data after the white balance correction is outputted.

13. A non-transitory computer-readable storage medium storing a program for causing a computer to execute each step of an image processing method, the method comprising:
performing a white balance correction by amplifying at least one color signal in relation to mosaic image data including a plurality of color signals outputted from an image sensor;
compressing the mosaic image data and obtaining compressed mosaic image data; and
controlling at least the white balance correction and the compression,
wherein in the controlling,
in a case where the compression is set to be off, the white balance correction is controlled to be substantially invalid, and the mosaic image data is outputted, and,
in a case where the compression is set to be on, the white balance correction is controlled to be valid, and the mosaic image data after the white balance correction is outputted.

14. An image processing apparatus, comprising:
at least one processor or circuit configured to function as following units:
a white balance correction unit configured to perform a white balance correction by amplifying at least one color signal in relation to mosaic image data including a plurality of color signals outputted from an image sensor;
a compression unit configured to compress the mosaic image data and obtain compressed mosaic image data; and
a control unit configured to control at least the white balance correction unit and the compression unit,
wherein the control unit,
in a case where compression by the compression unit is performed, controls so that the lower a compression ratio of the compression is, the lower a correction strength of the correction by the white balance correction unit becomes, and outputs the mosaic image data after the white balance correction.

15. An image processing method, comprising:
performing a white balance correction by amplifying at least one color signal in relation to mosaic image data including a plurality of color signals outputted from an image sensor;
compressing the mosaic image data and obtaining compressed mosaic image data; and
controlling at least the white balance correction and the compression,
wherein in the controlling,
in a case where the compression is performed, control is performed so that the lower a compression ratio of the compression is, the lower a correction strength of the white balance correction becomes, and the mosaic image data after the white balance correction is outputted.

* * * * *